United States Patent Office 3,444,274
Patented May 13, 1969

3,444,274
ASYMMETRICAL PARA-NITROPHENYL PHOSPHATES
Gerhard Schrader, Wuppertal-Cronenberg, Germany, assignor to Farbenfabriken Bayer Aktiengesellschaft, Leverkusen, Germany, a corporation of Germany
No Drawing. Filed Aug. 24, 1965, Ser. No. 482,285
Claims priority, application Germany, Oct. 29, 1964,
F 44,336
Int. Cl. C07f 9/12; A01n 9/36
U.S. Cl. 260—954        8 Claims

ABSTRACT OF THE DISCLOSURE

Asymmetric O,O-dialkyl-O-phenyl- and O-alkyl-O-cycloalkyl-O-phenyl-phosphoric acid esters having the general formula

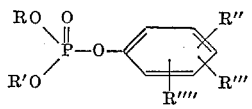

in which R is straight chain alkyl, R' is branched chain alkyl or cycloalkyl, R" is halo, nitro, cyano, thiocyano, alkylmercapto, alkylsulfoxyl, or alkylsulfonyl, R''' is hydrogen, halo, alkyl, or alkoxy, and R'''' is hydrogen or halo, which possess pesticidal properties.

---

The present invention relates to particular new asymmetric phosphoric acid esters, their compositions with carrier vehicles, and to processes for the preparation and use thereof.

It is an object of the present invention to provide particular new asymmetric phosphoric acid esters which possess valuable pesticidal, especially insecticidal and acaricidal, properties, to provide active compositions in the form of mixtures of such esters with solid and liquid dispersible carrier vehicles, to provide a process for producing such compounds, and to provide methods of using such compounds in a new way, especially for combating pests, particularly insects and acarids.

Other and further objects of the present invention will become apparent from a study of the within specification and accompanying examples.

It has been found in accordance with the present invention that asymmetric O,O-dialkyl-O-phenyl- and O-alkyl-O-cycloalkyl-O-phenyl-phosphoric acid esters having the general formula

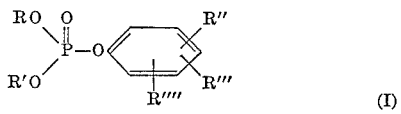

(I)

in which R is straight chain alkyl, R' is selected from the group consisting of branched chain alkyl and cycloalkyl, R" is selected from the group consisting of halo, nitro, cyano, thiocyanato, alkylmercapto, alkylsulfoxyl, and alkylsulfonyl, R''' is selected from the group consisting of hydrogen, halo, alkyl, and alkoxy, and R'''' is selected from the group consisting of hydrogen and halo, possess valuable pesticidal, especially insecticidal and acaricidal, properties.

It has been further found in accordance with the present invention that a process may now be provided for the preparation of such asymmetric phosphoric acid esters of Formula I above in a versatile manner and with markedly good yields, which comprises reacting a member selected from the group consisting of asymmetric O,O-dialkyl-phosphoric acid halide and O-alkyl-O-cycloalkyl-phosphoric acid halide having the general formula

(IIa)

in which R and R' are the same as defined above and Hal is halogen, with a phenol having the general formula

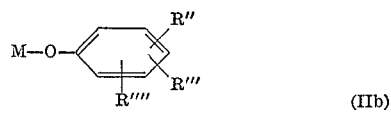

(IIb)

in which R", R''' and R'''' are the same as defined above and M is selected from the group consisting of hydrogen, alkali metal, and ammonium, in the presence of an acid binding agent where M is hydrogen, to form the corresponding phenyl-phosphoric acid ester.

The phosphoric acid halide used is formed conveniently by halogenating the corresponding phosphite with a halogenating agent at a temperature substantially between about 10 and 50° C.

Halogenating agents are chiefly sulfuryl chloride or elementary chlorine, while aromatic hydrocarbons, such as benzene, chlorobenzene, xylene and toluene, are especially suitable as inert solvents or diluents in which the halogenation can be carried out. Halogenation is preferably carried out in a temperature range of from substantially between about 10 to 50° C. and stirring of the reaction mixture is expediently continued after the addition of the halogenating agent for a further 5 to 30 minutes, optionally with slight warming. The asymmetric phosphites usable as starting materials are known from the literature and can be prepared, for example, according to the instructions of U.S. Patent No. 2,559,854, German patent specifications Nos. 1,059,425 and 1,078,558, or by the methods described by Kosolapoff (J.A.C.S., 73, 4989/1951) or by Michalski et al. (Roczniki Chem., 36, 97/1962; Chem. Ber., 95, 1629/1962).

The second step of the process according to the present invention, i.e. the reaction of the O,O-dialkyl or O-alkyl-O-cycloalkyl-phosphoric acid halides, obtained as intermediate products, with the appropriate phenols, is preferably carried out in the presence of acid binding agents. Alkali metal-carbonates, -alcoholates, e.g. -alkanolates, and -hydroxides are mainly to be considered for this purpose. It is, however, also possible first to prepare the salts, preferably the alkali metal or ammonium salts, of the above-mentioned phenols in substance and then to react these with the phosphoric acid chlorides.

The second step of the reaction according to the present invention is also advantageously carried out in an inert organic solvent and at a slightly to moderately elevated temperature (30 to 80° C.). Lower aliphatic alcohols, ethers or ketones, such as methanol, propanol, dimethyl ether, diethyl ether, dimethyl ketone, diethyl ketone, and the like, and, in particular, nitriles, such as acetonitrile and propionitrile, have been found to be especially suitable solvents.

Finally, in order to achieve good yields and to obtain pure products, it is expedient to heat the reaction mixture, after the reaction components have been combined, for some time (1 to 5 hours), while stirring at the stated temperature.

Most of the new phosphoric acid esters according to the present invention are colorless to slightly yellow-colored, viscous, water-insoluble oils, some of which can be distilled under strongly reduced pressure without decomposition.

The instant new compounds are distinguished by an excellent effectiveness against a great number of insect pests (aphids, flies, caterpillars, and the like), while some of them have only a low toxicity towards warm-blooded animals.

Thus, the new compounds of the instant invention can be used as pesticides either alone or in admixture with solid or liquid carriers or diluents.

The active compounds according to the instant invention can be utilized, if desired, in the form of the usual formulations or compositions with dispersible carrier vehicles, such as solutions, emulsions, suspensions, emulsifiable concentrates, spray powders, pastes, soluble powder, dusting agents, granulates, etc. These are prepared in known manner, for instance by extending the active agents with dispersible liquid diluent carriers and/or dispersible solid carriers optionally with the use of carrier vehicle assistants, including emulsifying agents and/or dispersing agents, whereby, for example, in the case where water is used as diluent, organic solvents may be added as auxiliary solvents (cf. Agricultural Chemicals, March 1960, pages 35-38). The following may be chiefly considered for use as carrier vehicles for this purpose: dispersible liquid diluent carriers, such as aromatic hydrocarbons (for instance, benzene, toluene, xylene, etc.), halogenated, especially chlorinated, aromatic hydrocarbons (for instance, chlorobenzenes), paraffins (for instance, petroleum fractions), chlorinated aliphatic hydrocarbons (for instance, methylene chloride, etc.), alcohols (for instance, methanol, ethanol, propanol, butanol, etc.), ethers, ether-alcohols (for instance, glycol monomethyl ether, etc.), amines (for instance, ethanolamine, etc.), amides (for instance, dimethyl formamide, etc.), ketones (for instance, acetone, etc.), and water; as well as dispersible finely divided solid carriers, such as natural ground minerals (for instance, kaolins, alumina, silica, chalk, i.e., calcium carbonate, talc, kieselguhr, etc.) and synthetic ground minerals (for instance, highly dispersed silicic acid, silicates, e.g. alkali silicates, etc.); whereas the following may be chiefly considered for use as carrier vehicle assistants for this purpose: emulsifying agents, such as non-ionic and anionic emulsifying agents (for instance, polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and dispersing agents, such as lignin, sulfite waste liquors, methyl cellulose, etc.

As will be appreciated by the artisan, the active compounds according to the instant invention may be present in such formulations or compositions in the form of mixtures with one another and with other known active substances, if desired.

The substances according to the invention may be employed by themselves as the artisan will appreciate, in the form of their compositions with solid or liquid dispersible carrier vehicles or other known compatible active agents, or in the form of particular dosage preparations for specific application made therefrom, such as solutions, emulsions, suspensions, powders, pastes, and granulates which are thus ready for use.

As concerns commercially marketed preparations, these generally contemplate carrier composition mixtures in which the active compound is present in an amount substantially between about 0.1–95% by weight, and preferably 0.5–90% by weight of the mixture, whereas carrier composition mixtures suitable for direct application or field application generally contemplate those in which the active compound is present in an amount substantially between about 0.00001 and 20%, preferably 0.0001 and 5% by weight of the mixture. Thus, the present invention contemplates over-all compositions which comprise mixtures of a dispersible carrier vehicle, such as a dispersible carrier solid, or a dispersible carrier liquid preferably including a carrier vehicle assistant such as an emulsifying agent and/or a dispersing agent, and an amount of the active compound which is effective for the purpose in question and which is generally between about 0.00001 and 95% by weight of the mixture. Specifically, the active compound may be applied to the agricultural area to be treated in concentrations substantially between about 1 and 10 kg. per hectare.

Furthermore, the present invention contemplates methods of combating pests, especially insects and acarids, which comprises applying to at least one of (a) such pests, especially insects and/or acarids, and (b) their habitat, a pesticidally, especially insecticidally and/or acaricidally, effective amount of the particular active compound of the invention alone or together with a carrier vehicle as noted above. The instant formulations or compositions are applied in the usual manner, for example, by spraying, atomizing, vaporizing, scattering, dusting, watering, sprinkling, pouring, and the like.

In comparison with the hitherto known O,O-dialkylphosphoric acid-O-phenyl esters of analogous constitution which contain two identical O-alkyl ester radicals in the molecule and which have been proposed for the same purpose, the compounds according to the present invention have the advantage of a considerably better insecticidal action and/or lower toxicity towards warm-blooded animals.

This definite technical superiority of the new compounds of the present invention over the comparable known active compounds of analogous constitution having the same kind of action is evident from the results of comparative tests set out in the following table:

TABLE

| Compound (constitution) | Test Insects | Concen. of Active Compound in Percent | Destruction of Pests in Percent |
|---|---|---|---|
| (III) iso-C$_3$H$_7$O\P(=O)/CH$_3$O —O—C$_6$H$_2$Cl$_3$ (according to invention) | Spider mites | 0.02 | 70 |
| (A) CH$_3$O\P(=O)/CH$_3$O —O—C$_6$H$_2$Cl$_3$ (known) | Spider mites | 0.02 | 0 |
| (IV) iso-C$_3$H$_7$O\P(=O)/CH$_3$O —O—C$_6$H$_4$—NO$_2$ (according to invention) | Aphids | 0.001 | 100 |

TABLE—Continued

| Compound (constitution) | | Test Insects | Concen. of Active Compound in Percent | Destruction of Pests in Percent |
|---|---|---|---|---|
| (B) | iso-C₃H₇O\P(=O)(iso-C₃H₇O)—O—C₆H₄—NO₂ (known) | Aphids | 0.005 | 80 |
| (V) | sec.C₄H₉O\P(=O)(CH₃O)—O—C₆H₄—NO₂ (according to invention) | Caterpillars<br>Aphids | 0.01<br>0.01<br>0.001 | 100<br>100<br>50 |
| (C) | sec.C₄H₉O\P(=O)(sec.C₄H₉O)—O—C₆H₄—NO₂ (known) | Caterpillars<br>Aphids | 0.01<br>0.01 | 0<br>0 |
| (VI) | iso-C₃H₇O\P(=O)(C₂H₅O)—O—C₆H₄—NO₂ (according to invention) | Aphids | 0.001 | 100 |
| (VII) | iso-C₃H₇O\P(=O)(CH₃O)—O—C₆H₄—SCH₃ (according to invention) | Caterpillars | 0.004 | 90 |
| (D) | CH₃O\P(=O)(CH₃O)—O—C₆H₄—SCH₃ (known) | Caterpillars | 0.004 | 0 |
| (VIII) | iso-C₃H₇O\P(=O)(CH₃O)—O—C₆H₃(CH₃)—SOCH₃ (according to invention) | Grain weevils | 0.01 | 50 |
| (E) | CH₃O\P(=O)(CH₃O)—O—C₆H₃(CH₃)—SOCH₃ (known) | Grain weevils | 0.01 | 0 |
| (IX) | iso-C₃H₇O\P(=O)(CH₃O)—O—C₆H₄—SO₂CH₃ (according to invention) | Ticks | 0.1<br>0.05<br>0.025 | 100<br>100<br>85 |
| (F) | CH₃O\P(=O)(CH₃O)—O—C₆H₄—SO₂CH₃ (known) | Ticks | 0.1<br>0.05 | 25<br>0 |
| (X) | iso-C₃H₇O\P(=O)(CH₃O)—O—C₆H₃(Cl)—Cl (according to invention) | Grain weevils<br>Mosquitoes | 0.1<br>0.001 | 100<br>100 |
| (G) | CH₃O\P(=O)(CH₃O)—O—C₆H₃(Cl)—Cl (known) | Grain weevils<br>Mosquitoes | 0.1<br>0.001<br>0.01 | 50<br>0 |

Due to their excellent insecticidal properties, the particular new compounds of the present invention are used as pest control agents, especially in plant protection and in the field of hygiene.

The following examples are given for the purpose of illustrating, while not limiting, the present invention:

Example 1

(a) 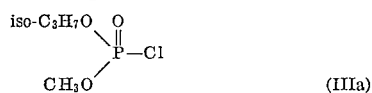 (IIIa)

414 grams (3 mols) of O-methyl-O-isopropyl phosphite are dissolved in 2000 cc. of benzene. 410 grams of sulfuryl chloride in 400 cc. of benzene are added, with stirring, at 20 to 30° C. to this solution, and the mixture is stirred for a further 10 minutes after the dropwise addition is finished. The benzene used as solvent is then distilled off under reduced pressure. The subsequent fractional distillation of the residue yields 461 g. (89% of the theoretical) of O - methyl-O-isopropyl-phosphoric acid chloride (B.P. 55° C./3 mm. Hg).

(b) 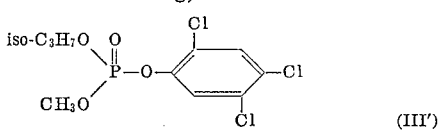 (III′)

80 grams of pulverized, dry potassium carbonate are added to a solution of 99 g. (0.5 mol) of 2,4,5-trichlorophenol in 300 cc. of acetonitrile. 87 g. (0.5 mol) of O-methyl-O-isopropyl phosphoric acid chloride are then added to the resulting solution dropwise at 30 to 40° C., while stirring. The reaction mixture is stirred for a further 3 hours at 40° C. and then poured into 500 cc. of ice water. The separated oil is taken up in 300 cc. of benzene and the benzene solution washed with water and then dried over anhydrous sodium sulfate. After evaporation of the solvent, the subsequent fractional distillation yields 147 g. (88% of the theoretical) of O-methyl-O-isopropyl-O-(2,4,5-trichlorophenyl)-phosphoric acid ester (B.P. 118° C./0.01 mm. Hg).

Example 2

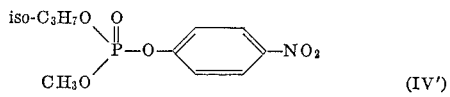 (IV′)

81 grams (0.5 mol) of 4-nitrophenol sodium salt are dissolved in 300 cc. of acetonitrile. 87 g. (0.5 mol) of O-methyl-O-isopropyl-phosphoric acid chloride are added dropwise at 40° C. to the resulting solution. The mixture is then stirred for a further 3 hours and the reaction mixture thereafter poured into 500 cc. of ice water. The separated oil is taken up in 300 cc. of benzene and the benzene solution washed with water and dried over anhydrous sodium sulfate. After the solvent has been distilled off, O-methyl-O-isopropyl-O-(4-nitrophenyl)-phosphoric acid ester remains as a pale yellow, water-insoluble oil. The yield is 115 g. (84% of the theoretical).

Example 3

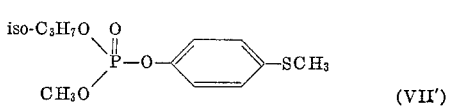 (VII′)

70 grams of (0.5 mol) of 4-methylmercaptophenol are dissolved in 300 cc. of acetonitrile. To the resulting solution there are first added 80 g. of pulverized, dry potassium carbonate and then, with stirring at 40° C., 87 g. (0.5 mol) of O-methyl-O-isopropyl-phosphoric acid chloride. The reaction mixture is then stirred for a further 3 hours at 40° C. and finally worked up as described in Example 1(b). 105 grams (76% of the theoretical) of O-methyl-O-isopropyl-O-(4 - methylmercaptophenyl)-phosphoric acid ester are thus obtained (B.P. 109° C./0.01 mm. Hg).

Under analogous reaction conditions, the following compounds are also obtained:

| | Constitution | Physical Properties | Yield (percent of the Theoretical) |
|---|---|---|---|
| (XI) | iso-C₃H₇O, CH₃O, P(=O)-O-C₆H₃(CH₃)-SCH₃ | B.P. 116° C./0.01 mm. Hg | 92 |
| (X′) | iso-C₃H₇O, CH₃O, P(=O)-O-C₆H₃(Cl)-Cl | B.P. 99° C./0.01 mm. Hg | 86 |
| (XII) | iso-C₃H₇O, CH₃O, P(=O)-O-C₆H₄-Cl | B.P. 94° C./0.01 mm. Hg | 87 |
| (VIII′) | iso-C₃H₇O, CH₃O, P(=O)-O-C₆H₃(CH₃)-SOCH₃ | Non-distillable, water-insoluble oil | 85 |
| (IX′) | iso-C₃H₇O, CH₃O, P(=O)-O-C₆H₄-SO₂CH₃ | do | 76 |
| (XIII) | iso-C₃H₇O, CH₃O, P(=O)-O-C₆H₄-CN | do | 82 |

Example 4

(a) 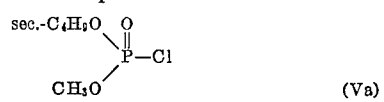 (Va)

A solution of 456 g. ( 3 mol) of O-methyl-O-sec.-butyl-phosphite in 2000 cc. of benzene is mixed at 25° C., while stirring, with 410 g. of sulfuryl chloride dissolved in 400 cc. of benzene. The reaction mixture is subsequently stirred for a further 10 minutes and then subjected to fractional distillation. After evaporation of the solvent, 385 g. (69% of the theoretical) of O-methyl-O-sec.-butyl-phosphoric acid chloride are obtained (B.P. 62° C./1 mm. Hg).

(b) 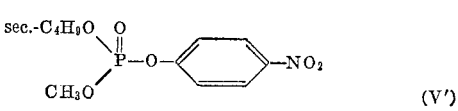 (V′)

80 grams (0.5 mol) of sodium 4-nitrophenolate are dissolved in 300 cc. of acetonitrile, and 94 g. of O-methyl-O-sec.-butyl-phosphoric acid chloride are added to this solution at 40° C., while stirring. The mixture is then stirred for a further 3 hours at 40 c. and worked up as described in Example 1(b). O-methyl-O-sec.-butyl-O-(4-nitrophenyl)-phosphoric acid ester is obtained in the form of a yellow, water-insoluble oil. The yield is 100 g. (69% of the theoretical).

*Analysis.*—Calc. for molecular weight 289: N, 4.7%; P, 10.1%. Found: N, 4.8%; P, 11.1%.

Example 5

(a) 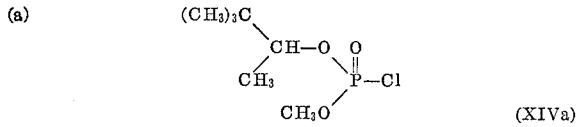

(XIVa)

540 grams (3 mol) of O-methyl-O-pinacolylphosphite are dissolved in 2000 cc. of benzene. 410 grams of sulfuryl chloride in 400 cc. of benzene are added to this solution at 25° C., while stirring. The mixture is then stirred for a further 5 minutes and the solvent removed under reduced pressure. 584 grams (90% of the theoretical) of O-methyl-O-pinacolylphosphoric acid chloride are thus obtained in the form of a pale yellow, water-insoluble oil.

(b) 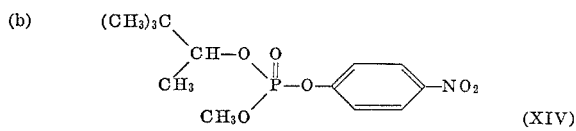

(XIV)

To a solution of 80 g. (0.5 mol) of sodium 4-nitrophenolate in 300 cc. of acetonitrile, 108 g. of O-methyl-O-pinacolylphosphoric acid chloride are added, with stirring, at 40° C. The reaction mixture is then stirred for a further 3 hours at 40° C. and worked up as described in Example 1(b). In this manner, 64 g. (64% of the theoretical) of O-methyl-O-pinacolyl-O-(4-nitrophenyl)-phosphoric acid ester [i.e. O-methyl-O-1,2,2-trimethyl-n-propyl-O-(4-nitrophenyl)-phosphoric acid ester] are obtained in the form of a pale yellow, water-insoluble oil.

*Analysis.*—Calc. for molecular weight 317: N, 4.4%; P, 9.8%. Found: N, 4.2%; P, 10.1%.

Example 6

(a) 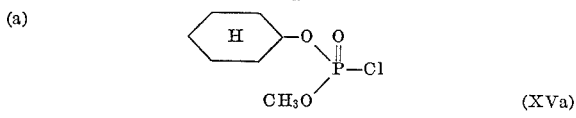

(XVa)

540 grams (3 mol) of O-methyl-O-cyclohexylphosphite are dissolved in 2000 cc. of benzene. 410 grams of sulfuryl chloride in 400 cc. of benzene are added dropwise at 25° C. to the solution obtained. The mixture is subsequently stirred for a further 10 minutes and the solvent then evaporated under reduced pressure. 575 grams (90% of the theoretical) of O-methyl-O-cyclohexylphosphoric acid chloride are thus obtained in the form of a water-insoluble, pale-yellow oil.

(b) 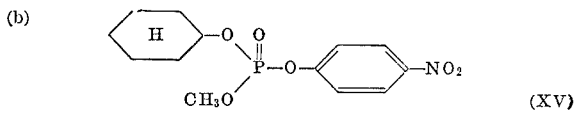

(XV)

A solution of 80 g. (0.5 mol) of sodium nitrophenolate in 300 cc. of acetonitrile is mixed dropwise at 40° C., while stirring, with 107 g. of O-methyl-O-cyclohexyl phoshoric acid chloride. After completion of the addition, the mixture is stirred for a further 3 hours at the stated temperature and then worked up as described in Example 1(b). 100 grams (64% of the theoretical) of O-methyl-O-cyclohexyl-O-(4-nitrophenyl)-phosphoric acid ester are obtained in the form of a yellow, water-insoluble oil.

*Analysis.*—Calc. for molecular weight 315: N, 4.4%; P, 9.9%. Found: N, 4.1%; P, 10.1%.

Example 7

(a) 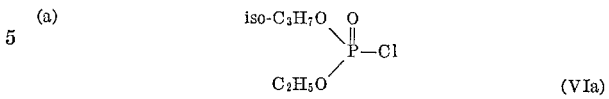

(VIa)

310 grams (2 mol) of O-methyl-O-isopropyl-phosphite are dissolved in 1000 cc. of benzene, and 270 g. of sulfuryl chloride in 200 cc. of benzene are added to this solution at 30° C., while stirring. The reaction mixture is then stirred for a further 10 minutes and subjected to fractional distillation. 325 grams (87% of the theoretical) of O-ethyl-O-isopropylphosphoric acid chloride are thus obtained (B.P. 64° C./3 mm. Hg).

(b) 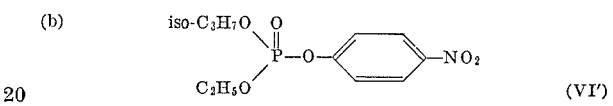

(VI')

65 grams of O-ethyl-O-isopropylphosphoric acid chloride are added at 50 to 60° C., while stirring, to a solution of 80 g. (0.5 mol) of sodium 4-nitrophenolate in 300 cc. acetonitrile. The mixture is then stirred for a further hour at 80° C. and worked up as described in Example 1(b). 90 grams (82% of the theoretical) of O-ethyl-O-isopropyl-O-(4-nitrophenyl) - phosphoric acid ester are obtained in the form of a yellow, water-insoluble oil.

*Analysis.*—Calc. for molecular weight 289: N, 4.8%; P, 10.8%. Found: N, 4.7%; P, 11.1%.

The procedure of Examples 1 to 6 is repeated, in each instance using corresponding molar amounts of phenolic ammonium salts, rather than the corresponding free phenols or sodium salts, with the appropriate asymmetric phosphoric acid chloride, whereupon analogous results are obtained.

In an analogous manner, using the procedure of Example 1 with corresponding molar amounts of the ingredients, i.e. acetonitrile, potassium carbonate, O-n-butyl-O-isoamyl-phosphoric acid chloride, and the following phenols: 4-cyanophenol; 3-thiocyanato-4-ethyl-phenol; 2-ethylmercapto-5-isobutylphenol; 2-tert.-butyl-mercapto-4-methoxyphenol; 3-n-propyl-sulfoxyl-4-isopropoxyphenol; 2-sec.-butyl-sulfoxylphenol; 2-isopropyl-sulfonyl-4-chlorophenol; and n-butyl-sulfonylphenol, the corresponding O-n-butyl-O-isoamyl-O-phenyl-phosphoric acid esters are produced.

In the same way, using O-n-butyl-O-isohexyl-phosphoric acid chloride, O-n-butyl-O-cyclopentyl-phosphoric acid chloride, and O-n-butyl-O-trimethyl-cyclohexyl-phosphoric acid chloride with the phenols enumerated immediately hereinabove, in corresponding molar amounts, the corresponding asymmetric O-n-butyl-O-isohexyl, O-n-butyl-O - cyclopentyl-, and O-n-butyl-O-trimethyl-cyclohexyl-O-phenyl-phosphoric acid esters are produced.

Of course, in the same manner, using the corresponding sodium or ammonium salt of the stated phenols, in accordance with the procedure of Example 2, for instance, analogous results are obtained.

In accordance with the present invention in particular the following phenols, according to general Formula IIb hereinabove, have proven to be particularly suitable: monochloro-, such as 2-, 3- and 4-chloro-; dichloro-, such as 2,4- and 2,5-dichloro-; trichloro-, such as 2,4,5- and 2,4,6-trichloro-; chloro- lower alkyl-, such as 2-chloro-4-methyl-, 3-chloro-4-methyl-, 3-methyl-4-chloro-, 2-chloro-4-tert.-butyl-; nitro-, such as 2-, 3- and 4-nitro-; chloronitro-, such as 2- and 3-chloro-4-nitro-, 3-nitro-4-chloro-, 3-nitro-4,6-dichloro-, 2-nitro-4-chloro-, 2,5- and 3,5-dichloro-4-nitro; nitro-lower alkyl, such as 2- and 3-methyl-4-nitro-, 3-nitro-4-methyl-; nitro-methoxy-, such as 2- and 3-methoxy-4-nitro-; cyano-, such as 4-cyano-; cyano-lower alkyl-, such as 2- and 3-methyl-4-cyano-; thiocyano-, such as 4-thiocyano-; thiocyano-lower alkyl-, such as 2- and 3-methyl-4-thiocyano-; lower alkylmercapto-, such as 4-

-methyl-mercapto-; lower alkyl sulfoxyl-, such as 4-methyl-sulfoxyl-; lower alkyl sulfonyl-, such as 4-methyl-sulfonyl-; lower alkylmercapto-lower alkyl-, such as 3-methyl-4-methyl-mercapto-; lower alkyl sulfoxyl-lower alkyl-, such as 3-methyl-4-methyl-sulfoxyl- and 3-methyl-4-methylsulfonyl-; and the like, -phenol, when used together with asymmetric phosphoric acid halides, especially phosphoric acid chlorides, such as those of Formula IIa hereinabove, in which R represents a straight chain alkyl radical containing up to 4 carbon atoms, for example, a methyl or ethyl radical, and in which R' represents a branched chain alkyl radical containing 3 to 6 carbon atoms, for example, an isopropyl, isobutyl, sec.-butyl, tert.-butyl, isoamyl, tert.-amyl, or 1,2,2-trimethylpropyl or pinacolyl radical, as well as a cyclopentyl, cyclohexyl, methyl-cyclohexyl, dimethyl-cyclohexyl or trimethyl-cyclohexyl radical.

Particularly suitable compounds herein are O-methyl-O-isopropyl-, O-ethyl-O-isopropyl-, O-methyl-O-sec.-butyl-, O-methyl-O-pinacolyl-, O-ethyl-O-sec.-butyl-, and O-ethyl-O-pinacolyl- -O-phenyl-phosphoric acid esters in which the phenyl substituents include mono, di- and trichloro, as well as nitro, methylmercapto, methyl-methylmercapto, methyl-methylsulfoxy, methylsulfonyl, and/or cyano, and the like.

Thus, in accordance with the present invention R represents straight chain alkyl, such as methyl, ethyl, n-propyl, n-butyl, n-amyl, and preferably straight chain lower alkyl, especially having 1 to 4 carbon atoms, and the like;

R' represents branched chain alkyl, such as isopropyl, isobutyl, sec.-butyl, tert.-butyl, isoamyl, tert.-amyl, isohexyl, pinacolyl (i.e., 1,2,2-trimethylpropyl), and preferably branched chain lower alkyl, especially having 3 to 6 carbon atoms, and the like; as well as cycloalkyl, such as cyclopentyl, cyclohexyl, methyl-, dimethyl- and trimethyl- -cyclohexyl, and preferably cycloalkyl having 5 to 6 ring carbon members, including $C_1$–$C_4$ lower alkyl substituted cycloalkyl having 5 to 6 ring carbon members, and the like;

R'' represents halo, such as chloro, bromo, fluoro, and iodo, preferably chloro; nitro; cyano; thiocyanato; alkylmercapto, such as methylmercapto, ethylmercapto, n-propylmercapto, n-butylmercapto, isobutylmercapto, sec. butylmercapto, tert-butylmercapto, and the like, preferably lower alkylmercapto, especially having 1 to 4 carbon atoms in the lower alkyl chain; alkyl sulfoxyl, such as methyl sulfoxyl, ethyl sulfoxyl, n-propyl sulfoxyl, isopropyl sulfoxyl, n-butyl sulfoxyl, isobutyl sulfoxyl, sec.-butyl sulfoxyl, tert.-butyl sulfoxyl, and the like, and preferably lower alkyl sulfoxyl, especially having 1 to 4 carbon atoms in the lower alkyl chain; and alkyl sulfonyl, such as methyl sulfonyl, ethyl sulfonyl, n-propyl sulfonyl, isopropyl sulfonyl, n-butyl sulfonyl, isobutyl sulfonyl, sec.-butyl sulfonyl, tert.-butyl sulfonyl, and the like, and preferably lower alkyl sulfonyl, especially having 1 to 4 carbon atoms in the lower alkyl chain;

R''' represents hydrogen; halo, such as chloro, bromo, fluoro and iodo, preferably chloro; alkyl, such as methyl, ethyl, n-propyl, isopropyl, n-butyl, isobutyl, sec.-butyl, tert-butyl, n-amyl, isoamyl, tert.-amyl, and the like, preferably lower alkyl, especially having 1 to 4 carbon atoms in the lower alkyl chain; alkoxy, such as methoxy, ethoxy, tert.-butoxy, n-amyloxy, isoamyloxy, and tert.-amyloxy, and the like, preferably lower alkoxy, especially having 1 to 4 carbon atoms in the lower alkoxy chain;

R'''' represents hydrogen and halo, such as chloro, bromo, fluoro and iodo, preferably chloro.

Most especially, the mono-, di- and tri-substituted phenyl groups (i.e., contemplated by R'', R''' and R'''') include mono-, di-, and tri-chlorophenyl, -chloro-lower alkyl-phenyl, nitro-phenyl, -chloronitro-phenyl, -nitro-lower alkyl-phenyl, -nitro-methoxy-phenyl, -cyano-phenyl, -cyano-lower alkyl-phenyl, -thiocyano-phenyl, -thiocyano-lower alkyl-phenyl, -lower alkylmercapto-phenyl, -lower alkylsulfoxyl-phenyl, -lower alkylsulfonyl-phenyl, -lower aklylmercapto-lower alkyl-phenyl, -lower alkylsulfoxyl-lower alkyl-phenyl, -lower alkylsulfonyl-lower alkyl-phenyl, etc.

As will be appreciated by the artisan, all of the compounds stated in connection with the working examples as well as all of the compounds coming within the purview of the foregoing definitions possess the desired pesticidal, especially insecticidal and acaricidal, activity, while possessing a markedly low toxicity toward warm-blooded animals. Such compounds all possess a considerably better insecticidal action than the corresponding symmetric O,O-dialkyl esters of phosphoric acid.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. Asymmetric O,O-dialkyl-O-phenyl- and O-alkyl-O-cycloalkyl-O-phenyl-phosphoric acid esters having the formula

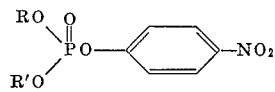

in which R is straight chain lower alkyl and R' is selected from the group consisting of branched chain lower alkyl having 3 to 6 carbon atoms and cycloalkyl having 5 to 6 ring carbon atoms 2. Asymmetric O,O-dialkyl-O-phenyl- and O-alkyl-O-cycloalkyl-O-phenyl-phosphoric acid esters having the formula

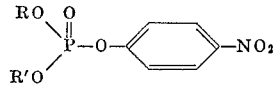

in which R is straight chain lower alkyl having 1 to 4 carbon atoms and R' is selected from the group consisting of branched chain lower alkyl having 3 to 6 carbon atoms and cyclohexyl.

3. Asymmetric O,O-dialkyl-O-phenyl- and O-alkyl-O-cycloalkyl-O-phenyl- phosphoric acid esters having the formula

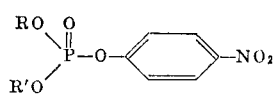

in which R is selected from the group consisting of methyl and ethyl and R' is selected from the group consisting of isopropyl, sec.-butyl, pinacolyl and cyclohexyl.

4. O - methyl-O - isopropyl - O-(4-nitrophenyl)-phosphoric acid ester having the formula

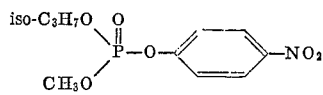

5. O-methyl - O - sec.-butyl - O-(4-nitrophenyl)-phosphoric acid ester having the formula

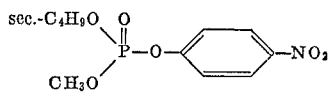

6. O-methyl - O - pinacolyl - O-(4-nitrophenyl)-phosphoric acid ester having the formula

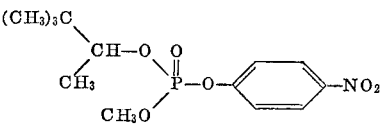

7. O-methyl-O - cyclohexyl - O-(4-nitrophenyl)-phosphoric acid ester having the formula

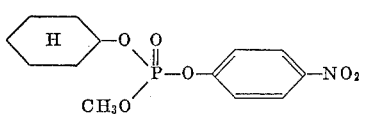

8. O-methyl - O - isopropyl - O-(4-nitrophenyl)-phosphoric acid ester having the formula

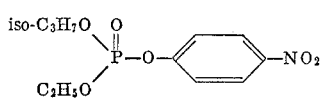

References Cited

UNITED STATES PATENTS

| 2,520,393 | 8/1950 | Fletcher | 260—954 |
| 2,678,329 | 5/1954 | Gamrath et al. | 260—964 |
| 2,891,085 | 6/1959 | Britton et al. | 260—964 |
| 3,131,120 | 4/1964 | Chupp et al. | 260—940 XR |
| 3,151,022 | 9/1964 | Gilbert et al. | 260—949 XR |
| 3,201,444 | 8/1965 | Schrader | 260—964 XR |
| 3,322,864 | 5/1967 | Schrader | 260—954 |

FOREIGN PATENTS 1,117,110  11/1961  Germany.

CHARLES B. PARKER, *Primary Examiner.*
A. H. SUTTO, *Assistant Examiner.*

UNITED STATES PATENT OFFICE
CERTIFICATE OF CORRECTION

Patent No. 3,444,274                              May 13, 1969

Gerhard Schrader

It is certified that error appears in the above identified patent and that said Letters Patent are hereby corrected as shown below:

Column 1, line 59, "halo-" should read -- halo, --. Column 4, in the Table, formula III, the right side of the formula should appear as shown below:

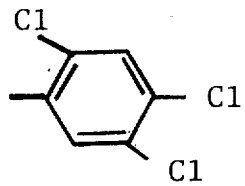

Column 4, in the Table, formula A, the left side of the formula should appear as shown below:

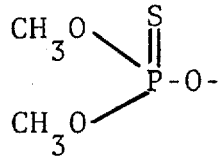

Column 5, in the Table, formula VIII, the left side of the formula should appear as shown below:

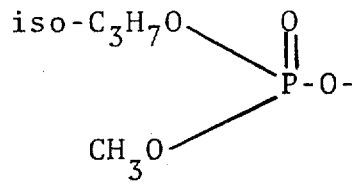

Column 5, in the Table, formula G, in the column "Destruction of Pests in Percent"

50
        50             should read       0
          0                                             100

Column 9, line 5, "40 c." should read -- 40° C. --; line 11, "P 10.1%" should read -- P 10.7% --. Column 10, line 8, "O-methyl" should read -- O-ethyl --.

Signed and sealed this 28th day of April 1970.

(SEAL)
Attest:

EDWARD M. FLETCHER, JR.                        WILLIAM E. SCHUYLER, JR.
Attesting Officer                                      Commissioner of Patents